United States Patent
Derelöv

(10) Patent No.: US 11,448,249 B2
(45) Date of Patent: *Sep. 20, 2022

(54) PANELS COMPRISING A MECHANICAL LOCKING DEVICE AND AN ASSEMBLED PRODUCT COMPRISING THE PANELS

(71) Applicant: Valinge Innovation AB, Viken (SE)

(72) Inventor: Peter Derelöv, Helsingborg (SE)

(73) Assignee: VALINGE INNOVATION AB, Viken (SE)

( * ) Notice: Subject to any disclaimer, the term of this patent is extended or adjusted under 35 U.S.C. 154(b) by 1018 days.

This patent is subject to a terminal disclaimer.

(21) Appl. No.: 15/642,757

(22) Filed: Jul. 6, 2017

(65) Prior Publication Data

US 2017/0298973 A1    Oct. 19, 2017

Related U.S. Application Data

(63) Continuation of application No. 14/573,473, filed on Dec. 17, 2014, now Pat. No. 9,714,672, which is a
(Continued)

(30) Foreign Application Priority Data

Jan. 10, 2014    (SE) .................................. 1450022-7

(51) Int. Cl.
*F16B 5/06* (2006.01)
*A47B 47/04* (2006.01)
(Continued)

(52) U.S. Cl.
CPC .......... *F16B 5/0614* (2013.01); *A47B 47/042* (2013.01); *F16B 12/125* (2013.01);
(Continued)

(58) Field of Classification Search
CPC ...... F16B 5/008; F16B 5/0012; F16B 5/0016; F16B 5/0024; F16B 12/12; F16B 12/125;
(Continued)

(56) References Cited

U.S. PATENT DOCUMENTS 291,032 A    1/1884   Cleland
634,581 A   10/1899   Miller
(Continued)

FOREIGN PATENT DOCUMENTS

CH    365 507 A    11/1962
CH    685 276 A5    5/1995
(Continued)

OTHER PUBLICATIONS

U.S. Appl. No. 16/220,574, Peter Derelöv, filed Dec. 14, 2018.
(Continued)

*Primary Examiner* — Jonathan P Masinick
(74) *Attorney, Agent, or Firm* — Buchanan Ingersoll & Rooney P.C.

(57) ABSTRACT

A set of panels includes a first panel having a first main plane and a second panel having a second main plane. The panels are provided with a mechanical locking device for locking a first edge of the first panel to a second edge of the second panel. The mechanical locking device includes an edge section groove at the first edge, wherein an edge section of the second edge is insertable into the edge section groove. A flexible tongue is arranged in an insertion groove provided in the edge section groove, and cooperates with a tongue groove provided at the edge section of the second panel. A first thickness of a core material between the edge section groove and the outermost surface of the first edge is greater than a minimum second thickness of a core material of the edge section of the second panel.

12 Claims, 7 Drawing Sheets

Related U.S. Application Data continuation-in-part of application No. 14/158,165, filed on Jan. 17, 2014, now Pat. No. 9,726,210.

(51) Int. Cl.
    *F16B 12/12*      (2006.01)
    *F16B 12/46*      (2006.01)

(52) U.S. Cl.
    CPC ........ *F16B 12/46* (2013.01); *F16B 2012/466* (2013.01); *Y10T 403/1674* (2015.01); *Y10T 403/7075* (2015.01)

(58) Field of Classification Search
    CPC ............... F16B 12/26; E04F 15/02038; E04F 15/020056; E04F 15/02077; E04F 2201/0138; E04F 2201/0146; E04F 2201/0523; E04F 2201/0505; E04F 2201/0107; E04F 2201/0115; A47B 47/0066; A47B 47/0091

See application file for complete search history.

(56) References Cited

U.S. PATENT DOCUMENTS

| | | |
|---|---|---|
| 701,000 A | 5/1902 | Ahrens |
| 861,911 A | 7/1907 | Stewart |
| 881,673 A | 3/1908 | Ellison |
| 1,533,099 A | 4/1925 | Carroll |
| 1,534,468 A | 4/1925 | Shea, Jr. |
| 1,800,386 A | 4/1931 | Hoffman |
| 1,800,387 A | 4/1931 | Greist |
| 1,802,245 A | 4/1931 | Foretich |
| 1,954,242 A | 4/1934 | Heppenstall |
| 2,360,451 A | 10/1944 | Stone |
| 2,362,904 A | 11/1944 | Kramer |
| 2,496,184 A | 1/1950 | Von Canon |
| 2,681,483 A | 6/1954 | Morawetz |
| 3,002,630 A | 10/1961 | Heisser |
| 3,195,968 A | 7/1965 | Freeman |
| 3,284,152 A | 11/1966 | Schörghuber |
| 3,313,054 A | 4/1967 | Madey |
| 3,347,610 A | 10/1967 | Pilliod |
| 3,410,441 A | 11/1968 | Rhyne |
| 3,722,704 A | 3/1973 | Piretti |
| 3,722,971 A | 3/1973 | Zeischegg |
| 3,742,807 A | 7/1973 | Manning |
| 3,765,465 A | 10/1973 | Gulistan |
| 3,784,271 A | 1/1974 | Schreiber |
| 3,884,002 A | 5/1975 | Logie |
| 3,885,845 A | 5/1975 | Krieks |
| 3,981,118 A | 9/1976 | Johnson et al. |
| 4,089,614 A | 5/1978 | Harley |
| 4,099,887 A | 7/1978 | MacKenroth |
| 4,116,510 A | 9/1978 | Franco |
| 4,142,271 A | 3/1979 | Busse |
| 4,211,379 A | 7/1980 | Morgan et al. |
| 4,222,544 A | 9/1980 | Crowder |
| 4,279,397 A | 7/1981 | Larsson |
| 4,299,067 A | 11/1981 | Bertschi |
| 4,308,961 A | 1/1982 | Kunce |
| 4,324,517 A | 4/1982 | Dey |
| 4,403,886 A | 9/1983 | Haeusler |
| 4,405,253 A | 9/1983 | Stockum |
| 4,509,648 A | 4/1985 | Govang |
| 4,593,734 A | 6/1986 | Wallace |
| 4,595,105 A | 6/1986 | Gold |
| 4,597,122 A | 7/1986 | Handler |
| 4,615,448 A | 10/1986 | Johnstonbaugh |
| 4,629,076 A | 12/1986 | Amstutz et al. |
| 4,750,794 A | 6/1988 | Vegh |
| 4,752,150 A | 6/1988 | Salice |
| 4,815,908 A | 3/1989 | Duran et al. |
| 4,817,900 A | 4/1989 | Whittington et al. |
| 4,844,266 A | 7/1989 | Small et al. |
| 4,883,331 A | 11/1989 | Mengel |
| 4,886,326 A | 12/1989 | Kuzyk |
| 4,888,933 A | 12/1989 | Guomundsson |
| 4,891,897 A | 1/1990 | Gieske et al. |
| 4,909,581 A | 3/1990 | Haheeb |
| 4,938,625 A | 7/1990 | Matsui |
| 4,944,416 A | 7/1990 | Petersen et al. |
| 4,961,295 A | 10/1990 | Kosch, Sr. et al. |
| 5,004,116 A | 4/1991 | Cattarozzi |
| 5,018,323 A | 5/1991 | Clausen |
| 5,109,993 A | 5/1992 | Hutchison |
| 5,114,265 A | 5/1992 | Grisley |
| 5,121,578 A | 6/1992 | Holz |
| 5,125,518 A | 6/1992 | Ward |
| 5,138,803 A | 8/1992 | Grossen |
| 5,209,556 A | 5/1993 | Anderson |
| 5,212,925 A | 5/1993 | McClinton |
| 5,299,509 A | 4/1994 | Ballard |
| 5,360,121 A | 11/1994 | Sothman |
| 5,375,802 A | 12/1994 | Branham, II |
| 5,423,155 A | 6/1995 | Bauer |
| 5,451,102 A | 9/1995 | Chuan |
| 5,458,433 A | 10/1995 | Statsny |
| 5,471,804 A | 12/1995 | Winter, IV |
| 5,475,960 A | 12/1995 | Lindal |
| 5,499,667 A | 3/1996 | Nakanishi |
| 5,499,886 A | 3/1996 | Short et al. |
| 5,507,331 A | 4/1996 | Nakanishi |
| 5,527,103 A | 6/1996 | Pittman |
| 5,658,086 A | 8/1997 | Brokaw et al. |
| 5,711,115 A | 1/1998 | Wirt |
| 5,775,521 A | 7/1998 | Tisbo |
| 5,810,505 A | 9/1998 | Henriott |
| 5,893,617 A | 4/1999 | Lee |
| 5,941,026 A | 8/1999 | Eisenreich |
| 5,944,294 A | 8/1999 | Baer |
| 5,950,389 A | 9/1999 | Porter |
| 6,045,290 A | 4/2000 | Nocievski |
| 6,050,426 A | 4/2000 | Leurdijk |
| 6,142,436 A | 11/2000 | Thurston et al. |
| 6,312,186 B1 | 11/2001 | Röck et al. |
| 6,349,507 B1 | 2/2002 | Muellerleile |
| 6,363,645 B1 | 4/2002 | Hunter |
| 6,413,007 B1 | 7/2002 | Lambright |
| 6,418,683 B1 | 7/2002 | Martensson |
| 6,491,172 B2 | 12/2002 | Chance |
| 6,505,452 B1 | 1/2003 | Hannig |
| 6,547,086 B1 | 4/2003 | Harvey |
| 6,578,498 B1 | 6/2003 | Draudt et al. |
| 6,675,979 B2 | 1/2004 | Taylor |
| D486,676 S | 2/2004 | Campbell et al. |
| 6,769,219 B2 | 8/2004 | Schwitte |
| 6,772,890 B2 | 8/2004 | Campbell et al. |
| 6,827,028 B1 | 12/2004 | Callaway |
| 6,971,614 B2 | 12/2005 | Fischer et al. |
| 7,127,860 B2 | 10/2006 | Pervan |
| 7,223,045 B2 | 5/2007 | Migli |
| 7,228,977 B2 | 6/2007 | Perkins et al. |
| 7,300,120 B2 | 11/2007 | Shin |
| 7,451,535 B2 | 11/2008 | Wells et al. |
| 7,451,578 B2 | 11/2008 | Hannig |
| 7,584,583 B2 | 9/2009 | Bergelin et al. |
| 7,614,350 B2 | 11/2009 | Tuttle et al. |
| 7,621,092 B2 | 11/2009 | Groeke et al. |
| 7,641,414 B1 | 1/2010 | Joyce |
| 7,717,278 B2 | 5/2010 | Kao |
| 7,721,503 B2 | 5/2010 | Pervan et al. |
| 7,793,450 B2 | 9/2010 | Chasmer et al. |
| 7,818,939 B2 | 10/2010 | Bearinger |
| 7,998,549 B2 | 8/2011 | Susnjara |
| 8,033,074 B2 | 10/2011 | Pervan |
| 8,038,363 B2 | 10/2011 | Hannig |
| 8,042,311 B2 | 10/2011 | Pervan |
| 8,146,754 B2 | 4/2012 | Apgood |
| 8,220,217 B2 | 7/2012 | Muehlebach |
| 8,234,830 B2 | 8/2012 | Pervan |
| 8,365,499 B2 | 2/2013 | Nilsson et al. |
| 8,387,327 B2 | 3/2013 | Pervan |
| 8,464,408 B2 | 6/2013 | Hazzard |

(56) References Cited

U.S. PATENT DOCUMENTS

| | | |
|---|---|---|
| 8,495,849 B2 | 7/2013 | Pervan |
| 8,505,257 B2 | 8/2013 | Boo et al. |
| 8,544,230 B2 | 10/2013 | Pervan |
| 8,596,013 B2 | 12/2013 | Boo |
| 8,602,227 B1 | 12/2013 | McDonald |
| 8,615,952 B2 | 12/2013 | Engström |
| 8,713,886 B2 | 5/2014 | Pervan |
| 8,745,952 B2 | 6/2014 | Perra |
| 8,764,137 B2 | 7/2014 | Fehre |
| 8,776,473 B2 | 7/2014 | Pervan |
| 8,833,028 B2 | 9/2014 | Whispell et al. |
| 8,864,407 B1 | 10/2014 | Sorum |
| 8,882,416 B2 | 11/2014 | Baur et al. |
| 8,887,468 B2 | 11/2014 | Håkansson et al. |
| 9,175,703 B2 | 11/2015 | Maertens |
| 9,216,541 B2 | 12/2015 | Boo |
| 9,290,948 B2 | 3/2016 | Cappelle et al. |
| 9,375,085 B2 | 6/2016 | Derelöv |
| 9,538,842 B2 | 1/2017 | Håkansson et al. |
| 9,655,442 B2 | 5/2017 | Boo et al. |
| 9,700,157 B2 | 7/2017 | Keyvanloo |
| 9,714,672 B2 | 7/2017 | Derelöv et al. |
| 9,723,923 B2 | 8/2017 | Derelöv |
| 9,726,210 B2 | 8/2017 | Derelöv et al. |
| 9,745,756 B2 | 8/2017 | Hannig |
| 9,758,973 B2 | 9/2017 | Segaert |
| 9,763,528 B2 | 9/2017 | Lung |
| 9,809,983 B2 | 11/2017 | Trudel |
| 9,945,121 B2 | 4/2018 | Derelöv |
| 10,034,541 B2 | 7/2018 | Boo et al. |
| 10,202,996 B2 | 2/2019 | Håkansson et al. |
| 10,378,570 B2 | 8/2019 | Broughton |
| 10,415,613 B2 | 9/2019 | Boo |
| 10,448,739 B2 | 10/2019 | Derelöv et al. |
| 10,451,097 B2 | 10/2019 | Brännström et al. |
| 10,486,245 B2 | 11/2019 | Fridlund |
| 10,506,875 B2 | 12/2019 | Boo et al. |
| 10,544,818 B2 | 1/2020 | Fridlund |
| 10,548,397 B2 | 2/2020 | Derelöv et al. |
| 10,669,716 B2 | 6/2020 | Derelöv et al. |
| 10,670,064 B2 | 6/2020 | Derelöv et al. |
| 10,830,266 B2 | 11/2020 | Fridlund |
| 10,830,268 B2 | 11/2020 | Boo |
| 10,871,179 B2 | 12/2020 | Håkansson et al. |
| 10,876,562 B2 | 12/2020 | Pervan |
| 10,876,563 B2 | 12/2020 | Derelöv et al. |
| 10,968,936 B2 | 4/2021 | Boo et al. |
| 11,076,691 B2 | 8/2021 | Boo |
| 11,083,287 B2 | 8/2021 | Boo et al. |
| 11,204,051 B2 | 12/2021 | Brännström et al. |
| 11,246,415 B2 | 2/2022 | Derelöv et al. |
| 2002/0170258 A1 | 11/2002 | Schwitte et al. |
| 2004/0165946 A1 | 8/2004 | Areh et al. |
| 2005/0042027 A1 | 2/2005 | Migli |
| 2005/0236544 A1 | 10/2005 | Mancino |
| 2005/0247653 A1 | 11/2005 | Brooks |
| 2006/0091093 A1 | 5/2006 | Armari |
| 2006/0101769 A1 | 5/2006 | Pervan et al. |
| 2006/0180561 A1 | 8/2006 | Wisnoski et al. |
| 2006/0236642 A1 | 10/2006 | Pervan |
| 2006/0273085 A1 | 12/2006 | Casto |
| 2007/0006543 A1 | 1/2007 | Engström |
| 2007/0028547 A1 | 2/2007 | Grafenauer et al. |
| 2008/0010937 A1 | 1/2008 | Pervan et al. |
| 2008/0066415 A1 | 3/2008 | Pervan |
| 2008/0193209 A1 | 8/2008 | Henderson |
| 2008/0216435 A1 | 9/2008 | Nolan |
| 2008/0236088 A1 | 10/2008 | Hannig et al. |
| 2008/0244882 A1 | 10/2008 | Woxman et al. |
| 2009/0014401 A1 | 1/2009 | Tallman |
| 2009/0064624 A1 | 3/2009 | Sokol |
| 2010/0028592 A1 | 2/2010 | Barkdoll et al. |
| 2010/0083603 A1 | 4/2010 | Goodwin |
| 2010/0104354 A1 | 4/2010 | Spalding |
| 2010/0173122 A1 | 7/2010 | Susnjara |
| 2010/0289389 A1 | 11/2010 | Crabtree, II |
| 2011/0023303 A1 | 2/2011 | Pervan et al. |
| 2011/0225921 A1 | 9/2011 | Schulte |
| 2011/0225922 A1 | 9/2011 | Pervan et al. |
| 2011/0280655 A1 | 11/2011 | Maertens |
| 2011/0283650 A1 | 11/2011 | Pervan et al. |
| 2012/0009383 A1 | 1/2012 | Hardesty |
| 2012/0027967 A1 | 2/2012 | Maertens |
| 2012/0073235 A1 | 3/2012 | Hannig |
| 2012/0124932 A1 | 5/2012 | Schulte et al. |
| 2012/0145845 A1 | 6/2012 | Hightower |
| 2012/0180416 A1 | 7/2012 | Perra et al. |
| 2012/0279161 A1 | 11/2012 | Håkansson et al. |
| 2012/0286637 A1 | 11/2012 | Fehre |
| 2013/0014463 A1 | 1/2013 | Pervan |
| 2013/0048632 A1 | 2/2013 | Chen |
| 2013/0071172 A1 | 3/2013 | Maertens et al. |
| 2013/0081349 A1 | 4/2013 | Pervan |
| 2013/0097846 A1 | 4/2013 | Pettigrew |
| 2013/0111845 A1 | 5/2013 | Pervan |
| 2013/0170904 A1 | 7/2013 | Cappelle |
| 2013/0232905 A2 | 9/2013 | Pervan |
| 2013/0287484 A1 | 10/2013 | Phillips |
| 2014/0013919 A1 | 1/2014 | Gerke et al. |
| 2014/0055018 A1 | 2/2014 | Shein et al. |
| 2014/0111076 A1 | 4/2014 | Devos |
| 2014/0286701 A1 | 9/2014 | Sauer |
| 2014/0294498 A1 | 10/2014 | Logan |
| 2015/0034522 A1 | 2/2015 | Itou et al. |
| 2015/0035422 A1 | 2/2015 | Håkansson et al. |
| 2015/0078807 A1 | 3/2015 | Brännström et al. |
| 2015/0078819 A1 | 3/2015 | Derelöv et al. |
| 2015/0196118 A1 | 7/2015 | Derelöv |
| 2015/0198191 A1 | 7/2015 | Boo |
| 2015/0230600 A1 | 8/2015 | Schulte |
| 2015/0368896 A1 | 12/2015 | Schulte |
| 2016/0000220 A1 | 1/2016 | Devos |
| 2016/0007751 A1 | 1/2016 | Derelöv |
| 2016/0145029 A1 | 5/2016 | Ranade et al. |
| 2016/0174704 A1 | 6/2016 | Boo et al. |
| 2016/0186925 A1 | 6/2016 | Bettin |
| 2016/0192775 A1 | 7/2016 | Andersson |
| 2016/0270531 A1 | 9/2016 | Derelöv |
| 2017/0079433 A1 | 3/2017 | Derelöv et al. |
| 2017/0089379 A1 | 3/2017 | Pervan |
| 2017/0097033 A1 | 4/2017 | Håkansson et al. |
| 2017/0159291 A1 | 6/2017 | Derelöv |
| 2017/0208938 A1 | 7/2017 | Derelöv et al. |
| 2017/0227031 A1 | 8/2017 | Boo |
| 2017/0227032 A1 | 8/2017 | Fridlund |
| 2017/0227035 A1 | 8/2017 | Fridlund |
| 2017/0234346 A1 | 8/2017 | Fridlund |
| 2017/0360193 A1 | 12/2017 | Boo |
| 2018/0080488 A1 | 3/2018 | Derelöv |
| 2018/0087552 A1 | 3/2018 | Derelöv et al. |
| 2018/0112695 A1 | 4/2018 | Boo et al. |
| 2018/0119717 A1 | 5/2018 | Derelöv |
| 2018/0202160 A1 | 7/2018 | Derelöv |
| 2018/0328396 A1 | 11/2018 | Fransson et al. |
| 2019/0113061 A1 | 4/2019 | Håkansson et al. |
| 2019/0166989 A1 | 6/2019 | Boo et al. |
| 2019/0191870 A1 | 6/2019 | Derelöv |
| 2019/0195256 A1 | 6/2019 | Derelöv |
| 2019/0289999 A1 | 9/2019 | Derelöv et al. |
| 2019/0320793 A1 | 10/2019 | Boo |
| 2019/0323532 A1 | 10/2019 | Boo |
| 2019/0323533 A1 | 10/2019 | Boo |
| 2019/0323534 A1 | 10/2019 | Derelöv |
| 2019/0323535 A1 | 10/2019 | Derelöv |
| 2020/0003242 A1 | 1/2020 | Brännström et al. |
| 2020/0055126 A1 | 2/2020 | Fridlund |
| 2020/0069048 A1 | 3/2020 | Derelöv et al. |
| 2020/0069049 A1 | 3/2020 | Derelöv et al. |
| 2020/0102978 A1 | 4/2020 | Fridlund |
| 2020/0214447 A1 | 7/2020 | Derelöv et al. |
| 2020/0300284 A1 | 9/2020 | Pervan |
| 2020/0337455 A1 | 10/2020 | Boo et al. |
| 2020/0340513 A1 | 10/2020 | Derelöv |
| 2021/0079650 A1 | 3/2021 | Derelöv |

(56) References Cited

U.S. PATENT DOCUMENTS

| | | | |
|---|---|---|---|
| 2021/0148392 A1 | 5/2021 | Brännström et al. |
| 2021/0180630 A1 | 6/2021 | Bruno et al. |
| 2021/0190112 A1 | 6/2021 | Derelöv |
| 2021/0207635 A1 | 7/2021 | Håkansson et al. |
| 2021/0222716 A1 | 7/2021 | Derelöv et al. |
| 2021/0381251 A1 | 12/2021 | Svensson |
| 2022/0018373 A1 | 1/2022 | Boo |

FOREIGN PATENT DOCUMENTS

| | | |
|---|---|---|
| CH | 696 889 A5 | 1/2008 |
| CH | 698 988 B1 | 12/2009 |
| CH | 705 082 A2 | 12/2012 |
| CN | 101099618 A | 1/2008 |
| CN | 102 917 616 A | 2/2013 |
| CN | 203424576 U | 2/2014 |
| DE | 1107910 B | 5/1961 |
| DE | 24 14 104 A1 | 10/1975 |
| DE | 25 14 357 A1 | 10/1975 |
| DE | 26 35 237 A | 2/1978 |
| DE | 31 03 281 A1 | 8/1982 |
| DE | 228 872 A1 | 10/1985 |
| DE | 42 29 115 A1 | 3/1993 |
| DE | 94 17 168 U1 | 2/1995 |
| DE | 198 31 936 A1 | 2/1999 |
| DE | 298 20 031 U1 | 2/1999 |
| DE | 198 05 538 A1 | 8/1999 |
| DE | 203 04 761 U1 | 4/2004 |
| DE | 299 24 630 U1 | 5/2004 |
| DE | 20 2005 019 986 U1 | 2/2006 |
| DE | 20 2004 017 486 U1 | 4/2006 |
| DE | 20 2008 011 589 U1 | 11/2008 |
| DE | 20 2009 008 825 U1 | 10/2009 |
| DE | 10 2008 035 293 A1 | 2/2010 |
| DE | 10 2009 041 142 A1 | 3/2011 |
| DE | 10 2011 057 018 A1 | 6/2013 |
| DE | 10 2013 008 595 A1 | 11/2013 |
| DE | 10 2015 103 429 U1 | 10/2015 |
| DE | 10 2014 110 124 A1 | 1/2016 |
| EP | 0 060 203 A2 | 9/1982 |
| EP | 0 060 203 A3 | 9/1982 |
| EP | 0 357 129 A1 | 3/1990 |
| EP | 0 362 968 A | 4/1990 |
| EP | 0 675 332 A2 | 10/1995 |
| EP | 0 871 156 A2 | 10/1998 |
| EP | 0 935 076 A1 | 8/1999 |
| EP | 1 048 423 A2 | 11/2000 |
| EP | 1 048 423 B9 | 5/2005 |
| EP | 1 650 375 A1 | 4/2006 |
| EP | 1 650 375 A8 | 4/2006 |
| EP | 1 671 562 A1 | 6/2006 |
| EP | 1 863 984 A1 | 12/2007 |
| EP | 1 922 954 A1 | 5/2008 |
| EP | 2 017 403 A2 | 1/2009 |
| EP | 2 037 128 A1 | 3/2009 |
| EP | 1 922 954 B1 | 7/2009 |
| EP | 2 333 353 A2 | 6/2011 |
| EP | 1 863 984 B1 | 11/2011 |
| EP | 2 487 373 A1 | 8/2012 |
| EP | 3 031 998 A1 | 6/2016 |
| FR | 2 062 731 A5 | 6/1971 |
| FR | 2 517 187 A1 | 6/1983 |
| FR | 2 597 173 A1 | 10/1987 |
| FR | 2 602 013 A1 | 1/1988 |
| GB | 245332 | 1/1926 |
| GB | 1 022 377 A | 3/1966 |
| GB | 2 163 825 A | 3/1986 |
| GB | 2 315 988 A | 2/1998 |
| GB | 2 445 954 A | 7/2008 |
| GB | 2 482 213 A | 1/2012 |
| GB | 2 520 927 A | 6/2015 |
| JP | S53-113160 U | 9/1978 |
| JP | H06-22606 U | 3/1994 |
| JP | 2003-239921 A | 8/2003 |
| KR | 10-1147274 B1 | 5/2012 |
| KR | 2014-0042314 A | 4/2014 |
| WO | WO 87/07339 A1 | 12/1987 |
| WO | WO 90/07066 | 6/1990 |
| WO | WO 99/22150 A1 | 5/1999 |
| WO | WO 99/41508 A2 | 8/1999 |
| WO | WO 00/66856 A1 | 11/2000 |
| WO | WO 01/02669 A1 | 1/2001 |
| WO | WO 01/02670 A1 | 1/2001 |
| WO | WO 01/51733 A1 | 7/2001 |
| WO | WO 01/53628 A1 | 7/2001 |
| WO | WO 02/055809 A1 | 7/2002 |
| WO | WO 02/055810 A1 | 7/2002 |
| WO | WO 03/016654 A1 | 2/2003 |
| WO | WO 03/027510 A2 | 4/2003 |
| WO | WO 03/083234 A1 | 10/2003 |
| WO | WO 2004/079130 A1 | 9/2004 |
| WO | WO 2005/068747 A1 | 7/2005 |
| WO | WO 2006/043893 A1 | 4/2006 |
| WO | WO 2006/103500 A1 | 10/2006 |
| WO | WO 2006/104436 A1 | 10/2006 |
| WO | WO 2007/015669 A2 | 2/2007 |
| WO | WO 2007/015669 A3 | 2/2007 |
| WO | WO 2007/079845 A1 | 7/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/017281 A1 | 2/2008 |
| WO | WO 2008/017301 A2 | 2/2008 |
| WO | WO 2008/017301 A3 | 2/2008 |
| WO | WO 2008/150234 A1 | 12/2008 |
| WO | WO 2009/136195 A1 | 11/2009 |
| WO | WO 2010/023042 A1 | 3/2010 |
| WO | WO 2010/070472 A2 | 6/2010 |
| WO | WO 2010/070472 A3 | 6/2010 |
| WO | WO 2010/070605 A2 | 6/2010 |
| WO | WO 2010/070605 A3 | 6/2010 |
| WO | WO 2010/082171 A2 | 7/2010 |
| WO | WO 2010/087752 A1 | 8/2010 |
| WO | WO 2011/012104 A2 | 2/2011 |
| WO | WO 2011/012104 A3 | 2/2011 |
| WO | WO 2011/085710 A1 | 7/2011 |
| WO | WO 2011/151737 A2 | 12/2011 |
| WO | WO 2011/151737 A3 | 12/2011 |
| WO | WO 2011/151737 A9 | 12/2011 |
| WO | WO 2011/151758 A2 | 12/2011 |
| WO | WO 2011/151758 A3 | 12/2011 |
| WO | WO 2012/095454 A1 | 7/2012 |
| WO | WO 2012/154113 A1 | 11/2012 |
| WO | WO 2013/009257 A1 | 1/2013 |
| WO | WO 2013/025163 A1 | 2/2013 |
| WO | WO 2013/080160 A1 | 6/2013 |
| WO | WO 2013/093636 A2 | 6/2013 |
| WO | WO 2013/093636 A3 | 6/2013 |
| WO | WO 2013/118075 A1 | 8/2013 |
| WO | WO 2014/072080 A1 | 5/2014 |
| WO | WO 2014/108114 A1 | 7/2014 |
| WO | WO 2014/12141 A1 | 8/2014 |
| WO | WO 2015/015603 A1 | 2/2015 |
| WO | WO 2015/038059 A1 | 3/2015 |
| WO | WO 2015/105449 A1 | 7/2015 |
| WO | WO 2015/105450 A1 | 7/2015 |
| WO | WO 2015/105451 A1 | 7/2015 |
| WO | WO 2016/187533 A1 | 11/2016 |
| WO | WO 2018/004435 A1 | 1/2018 |

OTHER PUBLICATIONS

U.S. Appl. No. 16/220,585, Peter Derelöv, filed Dec. 14, 2018.
U.S. Appl. No. 16/228,975, Niclas Håkansson and Darko Pervan, dated Dec. 21, 2018.
U.S. Appl. No. 16/361,609, Peter Derelöv, Johan Svensson and Lars Gunnarsson, filed Mar. 22, 2019.
U.S. Appl. No. 16/386,732, Christian Boo, filed Apr. 17, 2019.
U.S. Appl. No. 16/386,810, Christian Boo, filed Apr. 17, 2019.
U.S. Appl. No. 16/386,824, Christian Boo, filed Apr. 17, 2019.
U.S. Appl. No. 16/386,874, Peter Derelöv, filed Apr. 17, 2019.
U.S. Appl. No. 16/220,574, Derelöv.
U.S. Appl. No. 16/220,585, Derelöv.

(56) References Cited

OTHER PUBLICATIONS

U.S. Appl. No. 16/228,975, Håkansson et al.
U.S. Appl. No. 16/361,609, Derelöv.
U.S. Appl. No. 16/386,732, Boo.
U.S. Appl. No. 16/386,810, Boo.
U.S. Appl. No. 16/386,824, Boo.
U.S. Appl. No. 16/386,874, Derelöv.
Derelöv, Peter, U.S. Appl. No. 16/220,574 entitled "Set of Panels," filed Dec. 14, 2018.
Derelöv, Peter, U.S. Appl. No. 16/220,585 entitled "Set of Panels," filed Dec. 14, 2018.
Håkansson, Niclas, et al., U.S. Appl. No. 16/228,975 entitled "Mechanical Locking System for Building Panels," filed Dec. 21, 2018.
Derelöv, Peter, et al., U.S. Appl. No. 16/361,609 entitled "Panels Comprising a Mechanical Locking Device and an Assembled Product Comprising the Panels," filed Mar. 22, 2019.
Boo, Christian, U.S. Appl. No. 16/386,732 entitled "Set of Panels With a Mechanical Locking Device," filed Apr. 17, 2019.
Boo, Christian, U.S. Appl. No. 16/386,810 entitled "Set of Panels With a Mechanical Locking Device," filed Apr. 17, 2019.
Boo, Christian, U.S. Appl. No. 16/386,824 entitled "Set of Panels With a Mechanical Locking Device," filed Apr. 17, 2019.
Derelöv, Peter, U.S. Appl. No. 16/386,874 entitled "Symmetric Tongue and T-Cross," filed Apr. 17, 2019.
U.S. Appl. No. 15/562,254, Peter Derelöv, filed Sep. 27, 2017.
U.S. Appl. No. 15/567,507, Christian Boo, Peter Derelöv and Agne Pålsson, filed Oct. 18, 2017.
U.S. Appl. No. 15/794,491, Peter Derelöv, filed Oct. 26, 2017.
U.S. Appl. No. 15/848,164, Jonas Fransson, Andreas Blomgren and Karl Erikson, filed Dec. 20, 2017.
U.S. Appl. No. 15/923,701, Peter Derelöv, filed Mar. 16, 2018.
U.S. Appl. No. 15/562,254, Derelöv.
U.S. Appl. No. 15/567,507, Boo et al.
U.S. Appl. No. 15/794,491, Derelöv.
U.S. Appl. No. 15/848,164, Fransson, et al.
U.S. Appl. No. 15/923,701, Derelöv.
Derelöv, Peter, U.S. Appl. No. 15/562,254 entitled "Panel with a Slider", filed Sep. 27, 2017.
Boo, Christian, et al., U.S. Appl. No. 15/567,507 entitled "Panel With a Fastening Device," filed Oct. 18, 2017.
Derelöv, Peter, U.S. Appl. No. 15/794,491 entitled "Set of Panels with a Mechanical Locking Device", filed Oct. 26, 2017.
Fransson, Jonas, et al., U.S. Appl. No. 15/848,164 entitled "Device for Inserting a Tongue", filed Dec. 20, 2017.
Derelöv, Peter, U.S. Appl. No. 15/923,701 entitled "Panels Comprising a Mechanical Locking Device and an Assembled Product Comprising the Panels", filed Mar. 16, 2018.
U.S. Appl. No. 15/956,949, Peter Derelöv, filed Apr. 19, 2018.
U.S. Appl. No. 15/978,630, Jonas Fransson, Niclas Håkansson and and Agne Pålsson, filed May 14, 2018.
U.S. Appl. No. 16/027,479, Christian Boo and Peter Derelöv, filed Jul. 5, 2018.
U.S. Appl. No. 15/956,949, Derelöv.
U.S. Appl. No. 15/978,630, Fransson, et al.
U.S. Appl. No. 16/027,479, Boo, et al.
Derelöv, Peter, U.S. Appl. No. 15/956,949 entitled "Panels for an Assembled Product", filed Apr. 19, 2018.
Fransson, Jonas, et al., U.S. Appl. No. 15/978,630 entitled "Elements and a Locking Device for an Assembled Product," filed May 14, 2018.
Boo, Christian, et al., U.S. Appl. No. 16/027,479 entitled "Panels Comprising a Mechanical Locking Device and an Assembled Product Comprising the Panels," filed Jul. 5, 2018.
U.S. Appl. No. 14/486,681, Hans Brännström, filed Sep. 15, 2014 (Cited herein as US Patent Application Publication No. 2015/0078807 A1 of Mar. 19, 2015).
U.S. Appl. No. 14/573,572, Christian Boo, filed Dec. 17, 2014, (Cited herein as US Patent Application Publication No. 2015/0198191 A1 of Jul. 16, 2015).
U.S. Appl. No. 15/271,622, Peter Derelöv, filed Sep. 21, 2016, (Cited herein as US Patent Application Publication No. 2017/0079433 A1 of Mar. 23, 2017.
U.S. Appl. No. 15/308,872, Darko Pervan, filed Nov. 4, 2016, (Cited herein as US Patent Application Publication No. 2017/0089379 A1 of Mar. 30, 2017).
U.S. Appl. No. 15/379,791, Niclas Håkansson, filed Dec. 15, 2016, (Cited herein as US Patent Application Publication No. 2017/0097033 A1 of Apr. 6, 2017).
U.S. Appl. No. 15/366,704, Peter Derelöv, filed Dec. 1, 2016, (Cited herein as US Patent Application Publication No. 2017/0159291 A1 of Jun. 8, 2017).
U.S. Appl. No. 15/415,356, Peter Derelöv, filed Jan. 25, 2017 (Cited herein as US Patent Application Publication No. 2017/0208938 A1 of Jul. 27, 2017).
U.S. Appl. No. 15/422,798, Magnus Fridlund, filed Feb. 2, 2017 (Cited herein as US Patent Application Publication No. 2017/0227035 A1 of Aug. 10, 2017).
U.S. Appl. No. 15/428,469, Magnus Fridlund, filed Feb. 9, 2017 (Cited herein as US Patent Application Publication No. 2017/0227032 A1 of Aug. 10, 2017).
U.S. Appl. No. 15/428,504, Christian Boo, filed Feb. 9, 2017 (Cited herein as US Patent Application publication No. 2017/0227031 A1 of Aug. 10, 2017).
U.S. Appl. No. 15/432,190, Magnus Fridlund, filed Feb. 14, 2017 (Cited herein as US Patent Application Publication No. 2017/0234346 A1 of Aug. 17, 2017).
U.S. Appl. No. 15/584,633, Christian Boo, filed May 2, 2017.
U.S. Appl. No. 15/646,714, Peter Derelöv, filed Jul. 11, 2017.
U.S. Appl. No. 15/584,633, Boo.
U.S. Appl. No. 15/646,714, Derelöv et al.
International Search Report dated Apr. 16, 2015 in PCT/SE2014/051521, ISA/SE, Patent-och registreringsverket, Stockholm, SE, 4 pages.
Extended European Search issued in EP Patent Application No. 14877862.4 dated May 19, 2017, European Patent Office, Munich DE, 7 pages.
Boo, Christian, et al., U.S. Appl. No 15/584,633 entitled "Panels Comprising a Mechanical Locking Device and an Assembled Product Comprising the Panels", filed May 2, 2017.
Derelöv, Peter, et al., U.S. Appl. No. 15/646,714 entitled "Assembled Product and a Method of Assembling the Product", filed Jul. 11, 2017.
U.S. Appl. No. 16/564,438, Hans Brännström, Agne Pålsson and Peter Derelöv, filed Sep. 9, 2019, (Cited herein as US Patent Application No. 2020/0003242 A1 of Jan. 2, 2020).
U.S. Appl. No. 16/553,325, Peter Derelöv and Johan Svensson, filed Aug. 28, 2019.
U.S. Appl. No. 16/553,350, Peter Derelöv and Johan Svensson, filed Aug. 28, 2019.
U.S. Appl. No. 16/567,436, Peter Derelöv and Mats Nilsson, filed Sep. 11, 2019.
U.S. Appl. No. 16/663,603, Magnus Fridlund, filed Oct. 25, 2019.
U.S. Appl. No. 16/697,335, Christian Boo and Peter Derelöv, filed Nov. 27, 2019.
U.S. Appl. No. 16/703,077, Magnus Fridlund, filed Dec. 4, 2019.
U.S. Appl. No. 16/722,096, Peter Derelöv and Christian Boo, filed Dec. 20, 2019.
U.S. Appl. No. 16/553,325, Derelöv et al.
U.S. Appl. No. 16/553,350, Derelöv et al.
U.S. Appl. No. 16/567,436, Derelöv et al.
U.S. Appl. No. 16/663,603, Fridlund.
U.S. Appl. No. 16/697,335, Boo et al.
U.S. Appl. No. 16/703,077, Fridlund.
U.S. Appl. No. 16/722,096, Derelöv et al.
Extended European Search Report issued in EP Patent Application No. 19183663.4, dated Sep. 26, 2019, European Patent Office, Munich, DE, 9 pages.
Derelöv, Peter, U.S. Appl. No. 16/553,325 entitled "Set of Panels with a Mechanical Locking Device," filed Aug. 28, 2019.
Derelöv, Peter, U.S. Appl. No. 16/553,350 entitled "Set of Panels with a Mechanical Locking Device," filed Aug. 28, 2019.

(56) References Cited

OTHER PUBLICATIONS

Derelöv, Peter, U.S. Appl. No. 16/567,436 entitled "Panels Comprising a Mechanical Locking Device and an Assembled Product Comprising the Panels," filed Sep. 11, 2019.
Fridlund, Magnus, U.S. Appl. No. 16/663,603 entitled "Element and Method for Providing Dismantling Groove," filed Oct. 25, 2019.
Boo, Christian, et al., U.S. Appl. No. 16/697,335 entitled "Panels Comprising a Mechanical Locking Device and an Assembled Product Comprising the Panels," filed Nov. 27, 2019.
Fridlund, Magnus, U.S. Appl. No. 16/703,077 entitled "Set of Panels for an Assembled Product," filed Dec. 4, 2019.
Derelöv, Peter, et al., U.S. Appl. No. 16/722,096 entitled "Panels Comprising a Mechanical Locking Device and an Assembled Product Comprising the Panels," filed Dec. 20, 2019.
U.S. Appl. No. 17/119,392, Jimmie Bruno and Zoran Simunic, filed Dec. 11, 2020.
U.S. Appl. No. 17/126,518, Peter Derelöv, filed Dec. 18, 2020.
U.S. Appl. No. 17/119,392, Bruno et al.
U.S. Appl. No. 17/126,518, Derelöv et al.
Bruno, Jimmie, et al. U.S. Appl. No. 17/119,392 entitled "Mechanical Locking System for Panels," filed Dec. 11, 2020.
Derelöv, Peter, U.S. Appl. No. 17/126,518 entitled "Set of Panels with a Mechanical Locking Device," filed Dec. 18, 2020.
U.S. Appl. No. 17/514,055, Marko Sostar, filed Oct. 29, 2021.
U.S. Appl. No. 17/524,293, Hans Brännström, Agne Pålsson and Peter Derelöv, filed Nov. 11, 2021.
Sostar, Marko, U.S. Appl. No. 17/514,055 entitled "Set of Panels, A Method for Assembly of the Same, and a Locking Device for a Furniture Product," filed Oct. 29, 2021.
Brännström, Hans, et al., U.S. Appl. No. 17/524,293 entitled "Assembled Product and a Method of Assembling the Assembled Product," filed Nov. 11, 2021.
U.S. Appl. No. 17/546,356, Peter Derelöv and Hans Brännström, filed Dec. 9, 2021.
U.S. Appl. No. 17/556,146, Christian Boo, filed Dec. 20, 2021.
U.S. Appl. No. 17/665,160, Oscar Rydsjö, Marko Sostar and Patrik Carlsson, filed Feb. 4, 2022.
Derelöv, Peter, et al., U.S. Appl. No. 17/546,356 entitled "Rail for Cabinets," filed Dec. 9, 2021.
Boo, Christian, U.S. Appl. No. 17/556,146 entitled "Wedge-shaped Tongue Groove," filed Dec. 20, 2021.
Rydsjö, Oscar, U.S. Appl. No. 17/665,160 entitled "Mounting Bracket," filed Feb. 4, 2022.
U.S. Appl. No. 17/398,416, Thomas Meijer, filed Aug. 10, 2021.
Meijer, Thomas, U.S. Appl. No. 17/398,416 entitled "Panels with Edge Reinforcement," filed Aug. 10, 2021.
U.S. Appl. No. 16/951,394, Niclas Håkansson and Darko Pervan, filed Nov. 18, 2020.
U.S. Appl. No. 16/953,608, Peter Derelöv, Hans Brännström and Agne Pålsson, filed Nov. 20, 2020.
U.S. Appl. No. 16/951,394, Håkansson et al.
U.S. Appl. No. 16/953,608, Derelöv et al.
Håkansson, Niclas, et al., U.S. Appl. No. 16/951,394 entitled "Mechanical Locking System for Building Panels", filed Nov. 18, 2020.
Derelöv, Peter, et al., U.S. Appl. No. 16/953,608 entitled "An Assembled Product and Method of Assembling the Product," filed Nov. 20, 2020.
U.S. Appl. No. 16/861,639, Derelöv et al.
U.S. Appl. No. 16/946,047, Pervan.
U.S. Appl. No. 16/915,258, Brännström et al.
Derelöv, Peter, U.S. Appl. No. 16/861,639 entitled "Panels Comprising a Mechanical Locking Device and an Assembled Product Comprising the Panels," filed Apr. 29, 2020.
Pervan, Darko, U.S. Appl. No. 16/946,047 entitled "Mechanical Locking System for Building Panels," filed Jun. 4, 2020.
Brännström, Hans, et al., U.S. Appl. No. 16/915,258 entitled "Assembled Product and Method of Assembling the Assembled Product," filed Jun. 29, 2020.

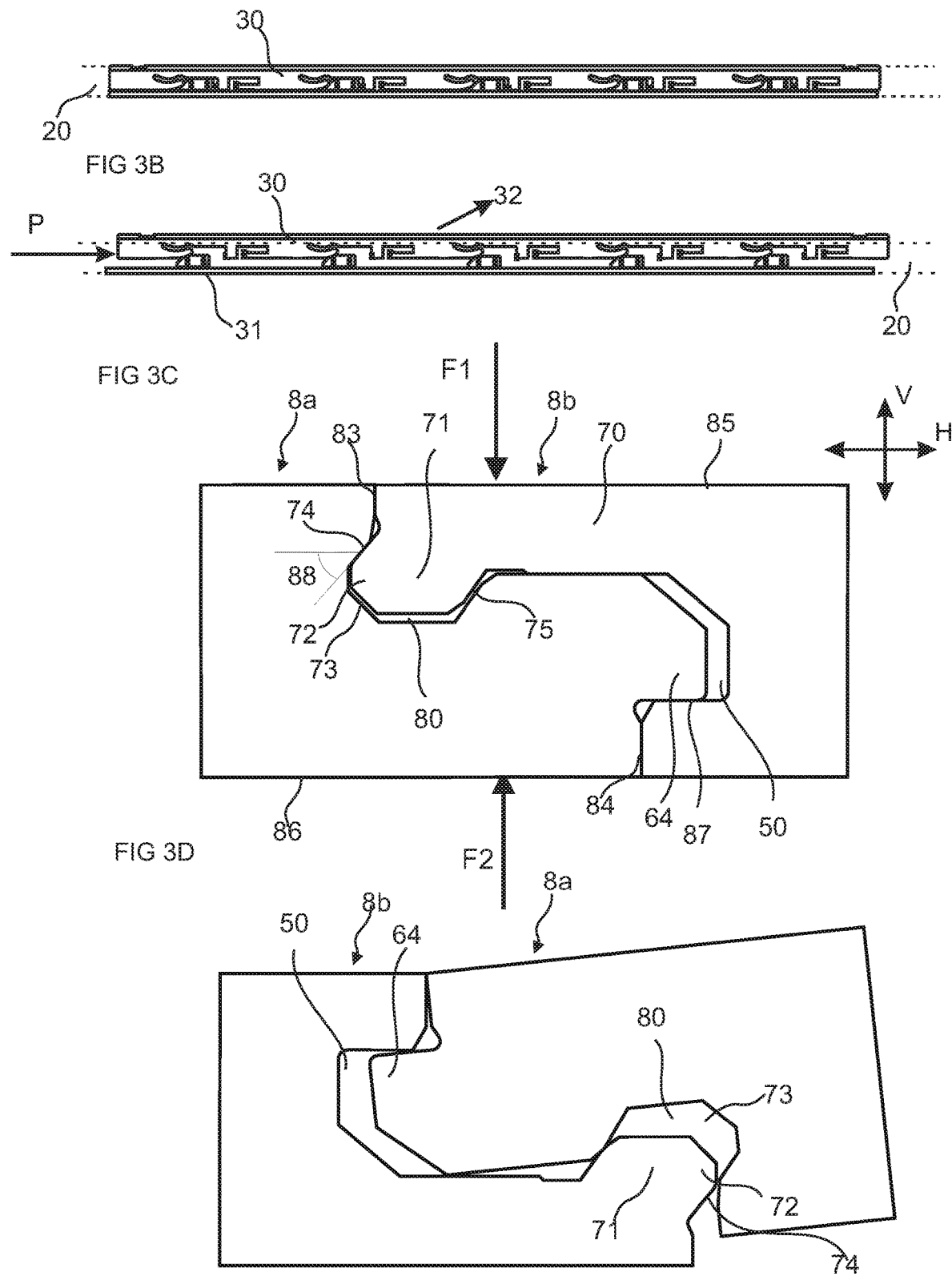

PANELS COMPRISING A MECHANICAL LOCKING DEVICE AND AN ASSEMBLED PRODUCT COMPRISING THE PANELS

CROSS REFERENCE TO RELATED APPLICATIONS

The present application is a continuation of U.S. application Ser. No. 14/573,473, filed on Dec. 17, 2014, which is a continuation-in-part of U.S. application Ser. No. 14/158,165, filed on Jan. 17, 2014, which claims the benefit of Swedish Application No. 1450022-7, filed on Jan. 10, 2014. The entire contents of each of U.S. application Ser. No. 14/158,165 and Swedish Application No. 1450022-7 are hereby incorporated herein by reference in their entirety.

TECHNICAL FIELD

The present disclosure relates to panels that may be arranged perpendicular to each other and locked together with a mechanical locking device. The panels may be assembled and locked together to obtain a furniture, such as a bookshelf, a cupboard, a wardrobe, a box, a drawer or a furniture component. The locking device may comprise a flexible tongue.

BACKGROUND

A furniture provided with a mechanical locking device is known in the art, as evidenced by WO2012154113(A1). The furniture comprises a first panel connected perpendicular to a second panel by a mechanical locking device comprising a flexible tongue in an insertion groove.

SUMMARY

One object of certain embodiments of the present disclosure is to provide an improvement over the above described technique and the known art. A specific objective is to improve the strength of a mechanical locking device at a corner of an assembled product, such as a furniture, a furniture component, a drawer, a cupboard, a bookshelf, a wardrobe, a kitchen fixture, or a box for storing or transporting.

A further object of embodiments of the present disclosure is to provide a furniture product with increased strength and stability.

At least some of these and other objects and advantages that will be apparent from the description have been achieved by a set of panels comprising a first panel having a first main plane and a second panel having a second main plane. The first panel and the second panel are provided with a mechanical locking device for locking a first edge of the first panel to a second edge of the second panel, wherein the first main plane is essentially perpendicular to the second main plane. Essentially perpendicular meaning that the first main plane is at an angle of $90°\pm10°$ of the second main plane. The first panel comprises a core comprising fibres arranged essentially parallel to the first main plane and the second panel comprises a core comprising fibres arranged essentially parallel to the second main plane. Essentially parallel meaning that the fibers are arranged at an angle of $0°\pm10°$ to the second main plane. The mechanical locking device comprises:

an edge section groove at the first edge, wherein an edge section of the second edge of the second panel is insertable into the edge section groove for locking the first panel and the second panel together in a first direction parallel to the first main plane; and a flexible tongue arranged in an insertion groove provided in the edge section groove of the first edge, wherein said flexible tongue cooperates with a tongue groove arranged at the edge section of the second edge of the second panel, for locking the first panel and the second panel in a second direction parallel to the second main plane.

A first thickness of a core material of the first panel between the edge section groove and the outermost surface of the first edge in a direction parallel to the first main plane is greater than a minimum second thickness of a core material of the edge section of the second edge of the second panel. Further, a first thickness of the first panel between the edge section groove and the outermost surface of the first edge in a direction parallel to the first main plane is greater than a minimum second thickness of the edge section of the second edge of the second panel.

The mechanical locking device may be subject to the greatest stress in the first direction parallel to the first main plane. The stress in the first direction may arise from a pressure load applied on the side panel at the top of a furniture, such as a bookshelf, a cupboard or a wardrobe. The minimum second thickness may be rather thin since the edge section of the second edge of the second panel has the fibre direction essentially perpendicular to the stress in the first direction. The first thickness is preferably greater than the minimum second distance because the fibre direction of the edge section groove of the first panel is essentially parallel to the stress in the first direction. The stress in the first direction may also arise before the first panel and the second panel are assembled and locked together, for example, during transport, production or during an assembling and locking of the first panel and the second panel.

The first thickness ranges from between 1.1 and 3.0 times larger than the minimum second thickness, and may be at least about 1.25 times larger; preferably about 1.5 time larger; and more preferably about 2.0 times larger than the minimum second thickness.

The first direction is preferably perpendicular to the first edge of the first panel and second direction is preferably perpendicular to the second edge of the second panel.

The flexible tongue may alternatively be arranged in an insertion groove in the edge section of the second edge of the second panel, and the tongue groove may be arranged in edge section groove of the first edge of the first panel. However, a greater size of the insertion groove, as compared to the tongue groove, may be required. Therefore, the alternative with the insertion groove in the edge section groove of the first panel may be the preferred alternative.

The edge section groove may comprise a first wall and an opposed second wall, wherein the first wall is closer to the outermost surface of the first edge than the second wall, wherein the first thickness is measured between the first wall and the outermost surface of the first edge.

The insertion groove may extend along essentially the entire length of the edge section groove of the first edge.

The tongue groove may extend along essentially the entire length of the edge section of second panel.

The edge section of the second panel may also comprise two or more insertion grooves and/or flexible tongues. The edge section of the first edge may comprise two or more tongue grooves.

The edge section groove may extend along essentially the whole first edge, and is preferably covered by a decorative layer, such as a plastic foil or a veneer, at a front edge of the first panel and may also be covered by a decorative layer, such as a plastic foil or a veneer at a back edge of the first panel. A length of the edge section of the second edge (measured along the second edge) preferably matches a length of the edge section groove (measured along the first edge). The second panel may be provided with at least one dismantling groove at an inner or outer face of the second panel. The embodiment of the first panel that is provided with the edge section groove that is covered at the back and the front edge is preferably connected to the embodiment of the second panel that is provided with at least one dismantling groove at the inner or outer face of the second panel. The dismantling groove is preferably adapted for insertion of a dismantling tool. The dismantling tool may be inserted into the dismantling groove to un-lock the mechanical locking device. The tongue groove at the edge section of the second edge of the second panel may be open at a back edge of the second panel. A dismantling tool may be inserted into the tongue groove provided that the edge section groove and the tongue groove are open at the back of the first and the second panel.

The flexible tongue may be displaceable in the insertion groove.

The edge section of the second panel may be provided with a calibrating groove.

The first panel or the second panel may be provided with a dismantling groove or recess, wherein dismantling groove or recess is preferably adapted for insertion of a dismantling tool.

The edge section of the second panel may comprise a first wall and an opposite second wall, wherein the tongue groove may be provided in the first wall, and the minimum second thickness may be measured between a bottom of the tongue groove and the second wall.

The flexible tongue may have a first displacement surface and an opposite second displacement surface which are configured to be displaced along a third displacement surface and a fourth displacement surface, respectively, of the insertion groove.

The core material of the first panel and the second panel may comprise a wood fibre based board, such as a HDF, MDF, plywood, solid wood or particleboard, a reinforced plastic board or a wood fibre composite board.

The first panel and the second panel are preferably provided with a decorative layer.

The outermost surface of the first edge of the first panel may be essentially in the same plane as, for example, flush with, an outer face of the second panel.

A second aspect of the present disclosure is an assembled product, such as a furniture, comprising the set of panels described above. The assembled product is preferably configured to be assembled without tools.

BRIEF DESCRIPTION OF THE DRAWINGS

Embodiments of the present disclosure will by way of example be described in more detail with reference to the appended schematic drawings, in which:

FIGS. 3A-3B show a flexible tongue according to an embodiment of the present disclosure.

FIGS. 3C-3D show a mechanical locking system for a backside or bottom panel according to an embodiment of the present disclosure.

DETAILED DESCRIPTION

Figure 1A:
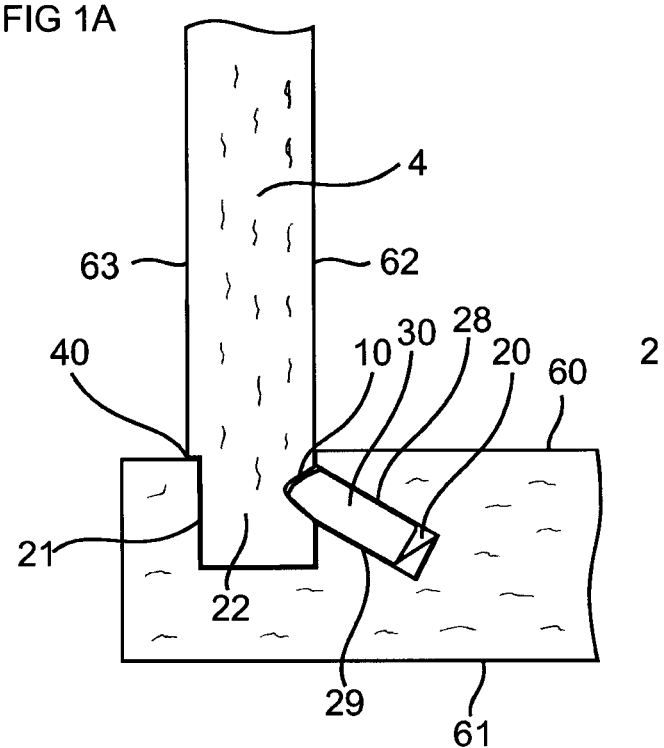
FIGS. 1A-1B show panels provided with a mechanical locking system according to an embodiment of the present disclosure.
Figure 1B:
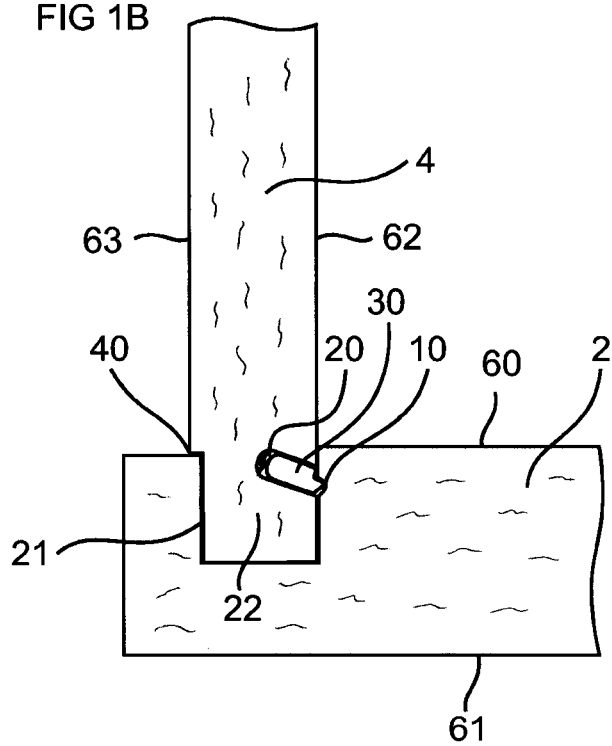

FIGS. 1A-B show two panels 2, 4 that are arranged perpendicular to each other and locked together. The two panels may be a part of a furniture or a furniture component, such as a bookshelf, a cupboard, a wardrobe, a box, a drawer or a furniture component. The two panels may be a first panel 2 having a first main plane and a second panel 4 having a second main plane. The first panel 2 and the second panel 4 are provided with a mechanical locking device for locking a first edge of the first panel 2 to a second edge of the second panel 4, wherein the first main plane is essentially perpendicular to the second main plane. The first panel 2 comprises a core comprising fibres arranged essentially parallel to the first main plane, and the second panel 4 comprises a core comprising fibres arranged essentially parallel to the second main plane. The mechanical locking device comprises an edge section groove 21 at the first edge, and an edge section 22 at the second edge of the second panel 4. The edge section 22 is inserted into the edge section groove 21 for locking the first panel 2 and the second panel 4 in a direction parallel to the first main plane. The mechanical locking device further comprises a flexible tongue 30 arranged in an insertion groove 20 preferably provided in the edge section groove 21 as shown in FIG. 1A. The flexible tongue 30 cooperates with a tongue groove 10, preferably provided at the edge section 22 as shown in FIG. 1A, for locking the first panel 2 and the second panel 4 in a direction parallel to the second main plane. The edge section groove 21 and the tongue groove 10 are preferably formed by mechanically cutting, such as milling, of the first panel 2 and the second panel 4, respectively. The first panel comprises an inner face 60 and an outer face 61 that are preferably essentially parallel to the first main plane. The second panel 4 comprises inner face 62 and an outer face 63 that are preferably essentially parallel to the second main plane. The inner face 60 of the first panel 2 and the inner face 62 of the second panel are preferably configured to face toward an inside of an assembled product. The edge section 22 of the second panel 4 may be provided with a calibrating groove 40, which reduces the thickness of the edge section 22, at the inner face 62 and/or the outer face 63 of the second panel 4. The calibrating groove 40 is preferably formed by mechanically cutting, such as milling, of the second panel 4.

FIG. 1B shows that the flexible tongue 30 may alternatively be arranged in an insertion groove 20 in the edge section 22 of the second panel 4 and the tongue groove 10 may be arranged in edge section groove 21 of the first edge of the first panel 2. However, a greater size of the insertion groove 20, as compared to the tongue groove 10, may be required. Therefore, the embodiment in FIG. 1A with the insertion groove 20 in the edge section groove 21 may be the preferred embodiment.

Figure 2A:
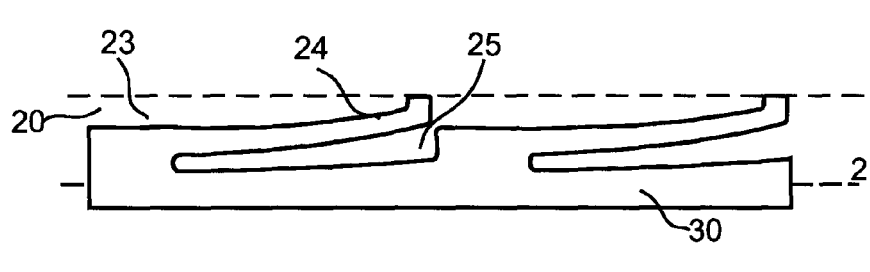
FIGS. 2A-2F show a flexible tongue according to an embodiment of the present disclosure.
Figure 2B:
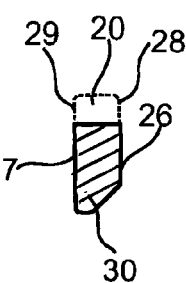
Figure 2C:
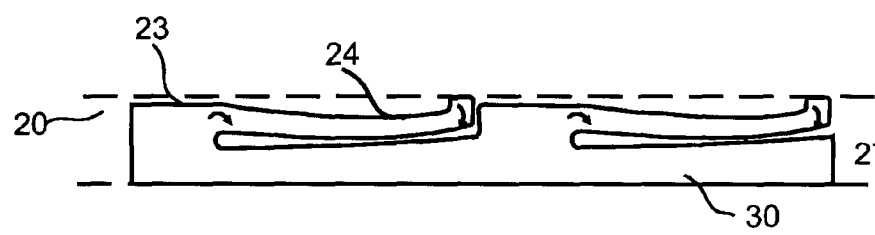
Figure 2D:
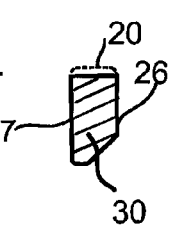

An embodiment of the flexible tongue 30, which is displaceable in an insertion groove 20, is shown in FIGS. 2A-2D. FIGS. 2A-2B show the flexible tongue 30 in a locked portion and FIGS. 2C-2D show the flexible tongue 30 during assembling of the first panel 2 and the second panel 4. FIG. 2B shows a cross section of the flexible tongue 30 in FIG. 2A. FIG. 2D shows a cross section of the flexile tongue 30 in FIG. 2C. The flexible tongue 30 comprises bendable protruding parts 24. A space 23 is provided between the flexible tongue 30 and a bottom wall of the insertion groove 20. FIG. 2C shows that the flexible tongue 30 is pushed into the insertion groove 20 and towards the bottom wall of the insertion groove 20 during assembly of the first panel 2 with the second panel 4. The flexible tongue 30 springs back toward its initial position when the first panel 2 and the second panel 4 have reached a locked position. A recess 25 is preferably arranged at each bendable protruding part.

The flexible tongue 30 may have a first displacement surface 26 and an opposite second displacement surface 27, configured to be displaced along a third displacement surface 28 and a fourth displacement surface 29, respectively, of the insertion groove 20.

Figure 2E:
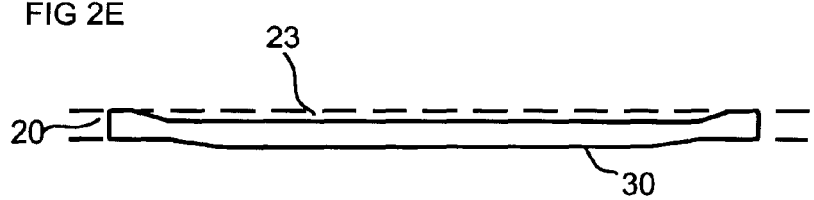
Figure 2F:
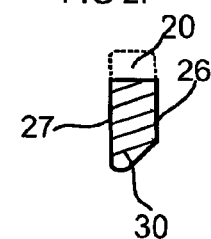

An alternative embodiment of the flexible tongue 30, without the protruding bendable parts 24, is shown in FIGS. 2E-2F. FIG. 2F shows a cross section of the flexible tongue 30 shown in FIG. 2E. The alternative embodiment is bendable in its length direction in order to accomplish the same function as the embodiment shown in FIGS. 2A-2D.

A further embodiment of the flexible tongue 30 is shown in FIGS. 3A-3B. FIG. 3A shows the flexible tongue 30 before the first panel 2 and the second panel 4 are locked in the direction parallel to the second main plane. The flexible tongue 30 comprises an inner part 31 provided with wedge elements and outer part for the locking of the first panel 2 and the second panel 4 in the direction parallel to the second main plane. The locking is obtained by applying a force P, in a direction parallel to the first edge of the first panel 2, at a short edge of the outer part. The force P displaces the outer part of the flexible tongue 30 in the direction parallel to the first edge of the first panel 2 and the wedge elements force the outer part of the flexible tongue 30 in a perpendicular direction, out of the insertion groove 20. The resulting displacement, shown with arrow 32, of the outer part of the flexible tongue 30 is therefore in a direction between the direction parallel to the first edge of the first panel 2 and the perpendicular direction. Each of the panels 2-6 may include a flexible tongue 30.

Figure 4A:
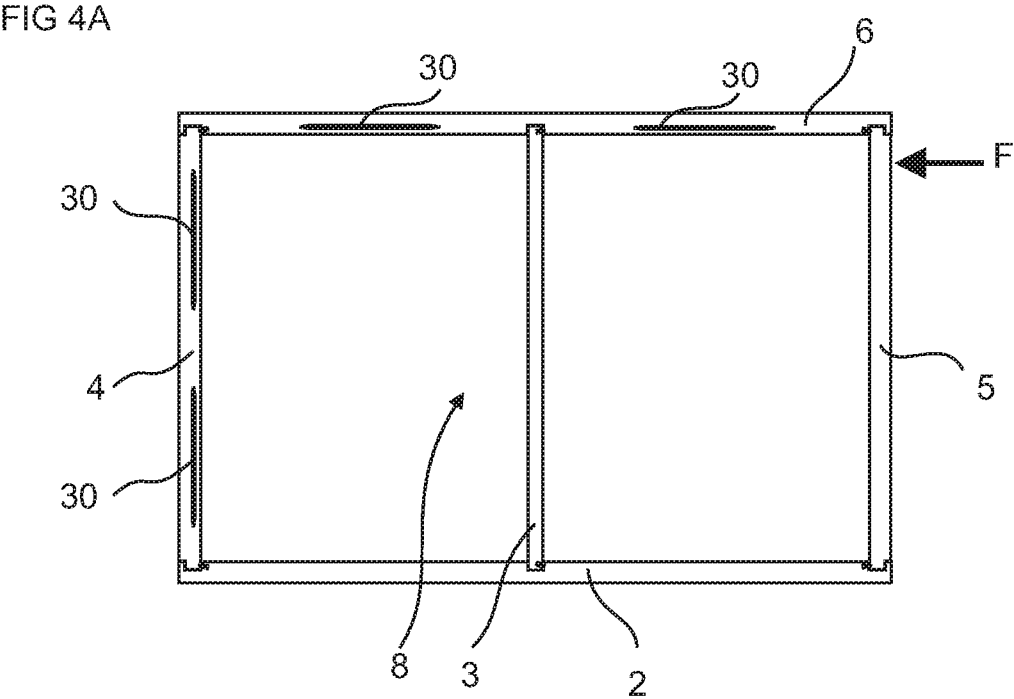
FIGS. 4A-4B show embodiments of an assembled product

FIG. 4A shows an assembled product, such as furniture, with a frame that comprises a first set of the first panel 2 and the second panel 4 locked to a second set of the first panel 6 and the second panel 5. A first edge of the second panel 4, 5 may be essentially identical to the second edge of the second panel 4, 5 and a second edge of the first panel 2, 6 may be essential identical to the first edge of the first panel 2, 6 to enable locking the first set and the second set together as shown in FIG. 4A. The first panel 2 of the first set is arranged opposite to the first panel 6 of the second set. The second panel 4 of the first set is arranged opposite the second panel 5 of the second set. A third panel 3 configured essentially as the second panel and provided with the flexible tongue 30 at an edge section of the third panel, may be locked to the first panel 2 of the first set and the first panel 6 of the second set.

Figure 4B:
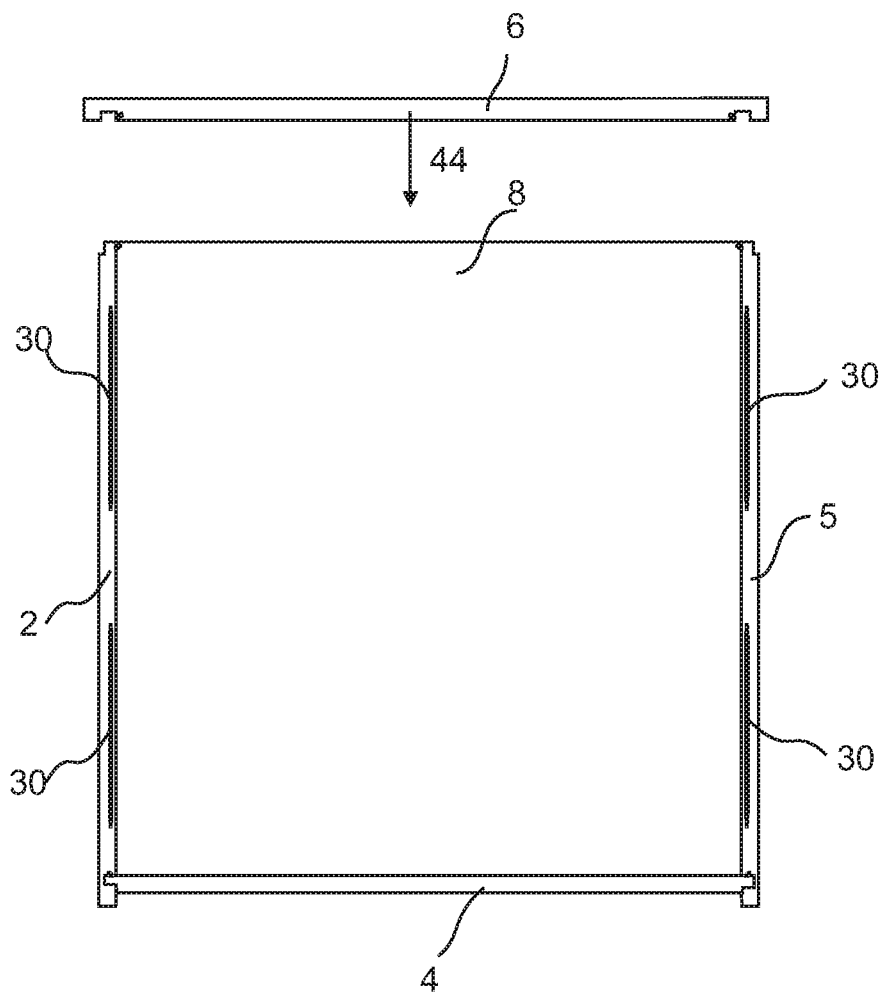

FIG. 4B shows an alternative embodiment of the frame with an alternative configuration of the first edge of the second panel 6 of the second set and the second edge of the first panel 2 of the first set. FIG. 4B shows that assembly involves, using the first panel 6 of the second set as an example, simply displacing the first panel in the direction of arrow 44 such that no further steps or tools may be necessary to lock the first panel 6 of the second set with other panels of the product. See also, Swedish patent application SE 1351060-7, which is expressly incorporated herein by reference in its entirety.

All edges of the panels 2-6 of the assembled product may be locked together with a mechanical device comprising the flexible tongue 30. The assembling may be completed without the use of tools and/or binding agents such as glue.

A fourth panel 8, such as a back panel or a bottom panel, may be arranged in a third main plane, which is essentially perpendicular to the first main plane and the second main plane. A first edge and a second edge of the fourth panel 8 may be locked by a mechanical locking device at a first back or bottom edge and a second back or bottom edge, respectively, of the frame. A third edge and a fourth edge of the fourth panel 8 are preferably inserted into a groove provided at a third back or bottom edge and a fourth back or bottom edge, respectively, of the frame. The frame may be subject so a force F during transportation, production or assembling of the assembled product. Locking of the fourth panel 8 to the frame by the mechanical locking device improves the strength and the stability of the assembled product. The fourth panel may comprise two or more elements 8a, 8b which are preferably locked together by a mechanical locking system. An embodiment of the mechanical locking system is shown in FIG. 3C, discussed below.

The first panel 6 of the second set may be locked to the other panels of the frame at a later occasion and/or at another location. The first panel 6 of the second set may be locked to the other panels of the frame and the bottom or back panel by simple displacement 44 as discussed above, and no further steps or tools may be necessary.

FIG. 3C shows an embodiment of a furniture panel 8, such as a back or bottom panel, comprising a first element 8a and a second element 8b provided with a mechanical locking system configured to lock the first 8a element and the second element 8b together.

The first main plane of the first element 8a is essentially parallel to a second main plane of the second element 8b, wherein the furniture panel comprises a first face 85 and an opposite second face 86 which are parallel to a main plane of the furniture panel 8. The mechanical locking system may include:

- a first tongue 64 provided at a first edge of the first element 8a, wherein the first tongue 64 is configured to cooperate with a first tongue groove 50 provided at a second edge of the second element 8b for locking together the first element 8a and the second element 8b in a vertical direction V;
- a second tongue 72 at the second edge of the second element 8b, wherein the second tongue 72 is configured to cooperate with a second tongue groove 73 at the first edge of the first element 8a for locking together the first element 8a and the second element 8b in the vertical direction V;
- a first pair of locking surfaces 83 provided above the second tongue 72 and the second tongue groove 73 for locking together the first element 8a and the second element 8b in a horizontal direction H; and second pair of locking surfaces 84 provided below the first tongue 64 and the first tongue groove 50 for locking together the first element 8a and the second element 8b in the horizontal direction H.

The first pair of locking surfaces 83 is preferably essentially vertical. The second pair of locking surfaces 84 is also preferably essentially vertical.

The first tongue 64 and the first tongue groove 50 cooperate at a third pair of locking surfaces 87 that is preferably arranged essentially horizontally.

The second tongue 72 and the second tongue groove 73 cooperate at a fourth pair of locking surfaces 74 that is preferably arranged at an angle 88 to the main plane of the furniture panel 8 that is greater than zero. The angle 88 has a range that allows the first element 8a to be locked to the second element 8b by an angling motion of the first element 8a relative to the second element 8b or of the second element 8b relative to the first element 8a, wherein the first tongue 64 is inserted in the first tongue groove 50.

The first face 85 of the first element 8a and the second element 8b is arranged upwards in the vertical direction, e.g., in the direction were the greatest load F1 is likely to be exerted on the furniture panel 8, to prevent the first element 8a and the second element 8b from being unlocked by a reversed angling motion. A second face 86 is arranged downwards in the vertical direction, e.g., in the direction where the smallest load F2 is likely to be applied on the furniture panel 8.

Figure 5:
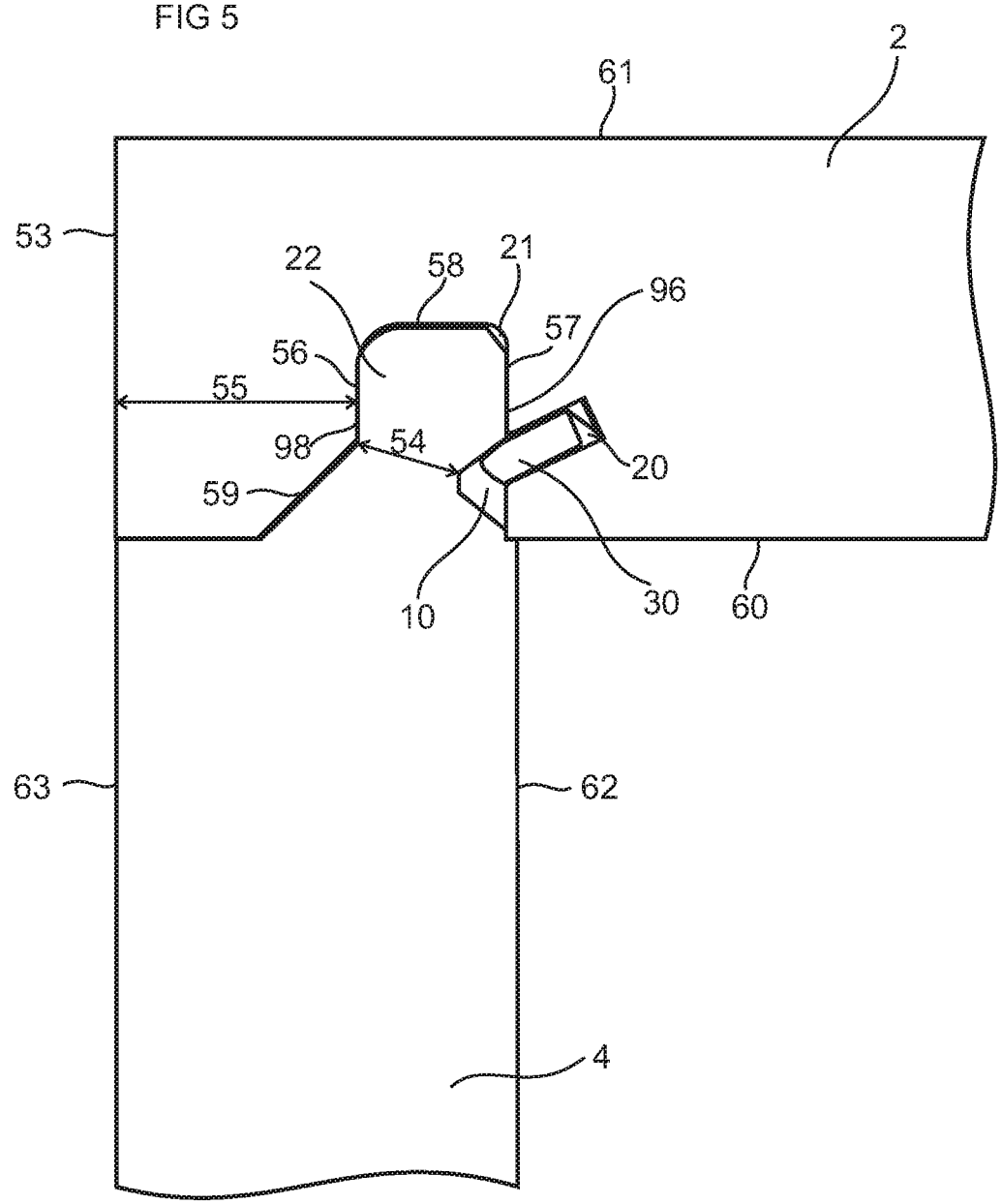
FIG. 5 shows panels provided with a mechanical locking system according to an embodiment of the present disclosure.

The second element 8b may include a strip 70 extending from first tongue groove 50 and including a protruding element 71 and the. The strip 70 may include a recess adjacent the protruding element 71. The protruding element 71 essentially matches a third groove 80 provided at the first edge of the first element 8a. The protruding element 71 may protrude upwards in the vertical direction V and the groove 80 may be open downwards in the vertical direction V. A third space 75, that extends in the horizontal direction H, may be provided between the protruding element 73 and the third groove 80. The third space 75 may facilitate the locking by an angling motion. FIG. 5 shows an embodiment that comprises a first thickness 55 of a core material of the first panel 2, between the edge section groove 21 and the outermost surface of the first edge in a direction parallel to the first main plane. The first thickness 55 is greater than a minimum second thickness 54 of a core material of the edge section 22 of the second panel 4. The first thickness 55 ranges from between 1.1 and 3.0 times larger than the minimum second thickness 54, and may be at least about 1.25 times larger; preferably about 1.5 times larger; and more preferably about 2.0 times larger than the minimum second thickness. In an embodiment, the edge section groove 21 comprises a first wall 56 and an opposed second wall 57, wherein the first wall 56 is closer to the outermost surface 53 of the first edge than the second wall 57. The first thickness 55 is preferably measured between the first wall 56 and the outermost surface 53 of the first edge. The first wall 56 and the second wall 57 are preferably connected by a bottom wall 58.

The edge section 22 of the second panel 4 may comprise a first wall 96 and an opposite second wall 98, wherein the tongue groove 10 is provided in the first wall 96. The minimum second thickness 54 may be measured between a bottom of the tongue groove 10 and the second wall 98.

In the embodiment, having the insertion groove 20 extend along essentially the entire length of the edge section groove 21 of first edge of the first panel may lead to an easier production of the first panel 2. Having the tongue groove 10 extend along essentially the entire length of the edge section 22 of the second panel 4 may also lead to an easier production of the second panel 4.

The outermost surface 53 of the first panel 2 is in a preferred embodiment essentially in the same plane as, for example, flush with, the outer face 63 of the of the second panel 4.

An edge of the opening of the edge section groove 21 may be provided with a bevel 59 or rounding in order to facilitate the insertion of the flexible tongue 30 into the insertion groove 20.

Figure 6A:
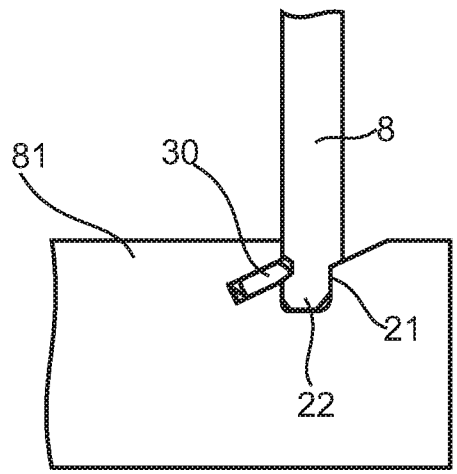
FIGS. 6A-6B show panels provided with a mechanical locking system according to an embodiment of the present disclosure.

FIG. 6A shows an embodiment of a mechanical locking device for locking the fourth panel 8 to any first or second back or bottom edge 81 of a frame. An embodiment of the frame is shown in FIGS. 4A-4B. The mechanical locking device may be essentially identical to the mechanical locking device described above.

Figure 6B:
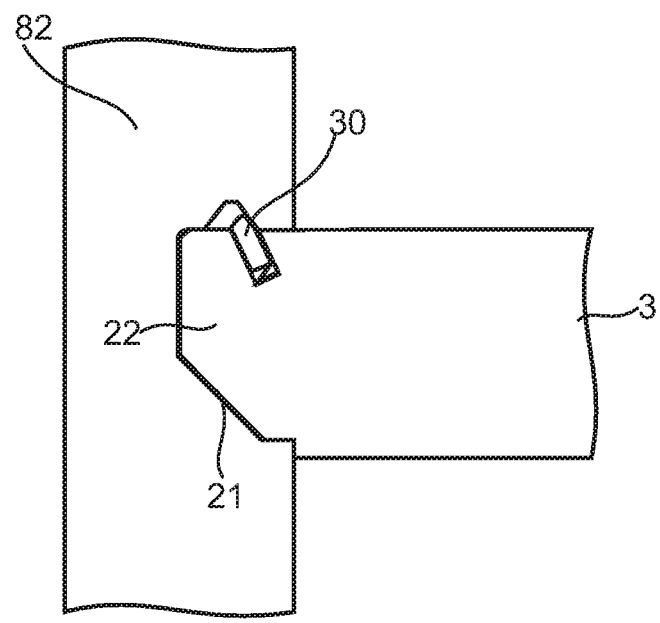

FIG. 6B shows an embodiment of a mechanical locking device for locking the third panel 3 to any first or second panel 82 of a frame. An embodiment of the frame is shown in FIGS. 4A-4B. The mechanical locking device may be essentially identical to the locking device described above.

Figure 7A:
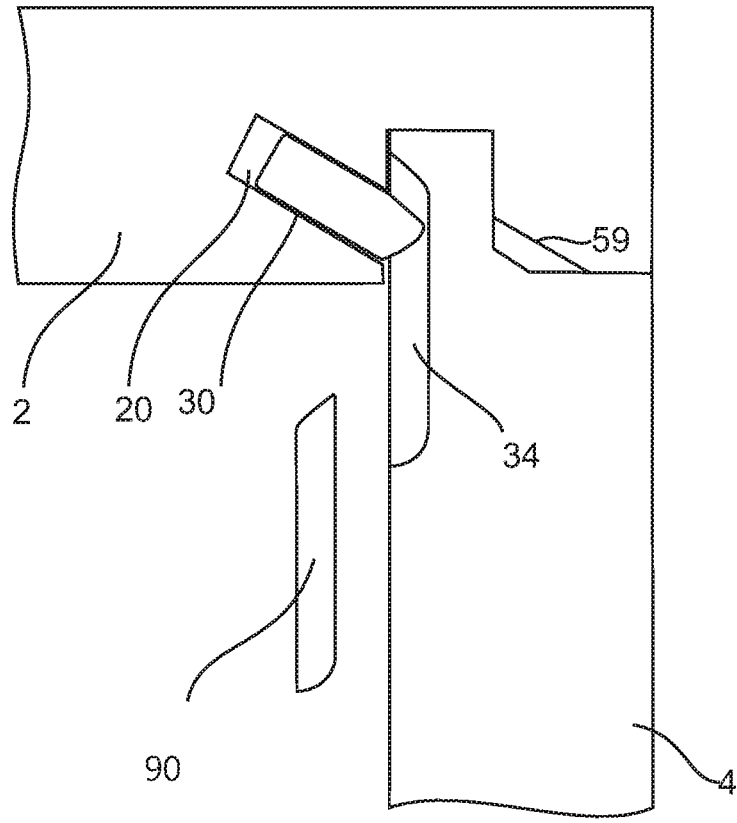
FIGS. 7A-7B show panels and a disassembling tool and groove according to an embodiment of the present disclosure.
Figure 7B:
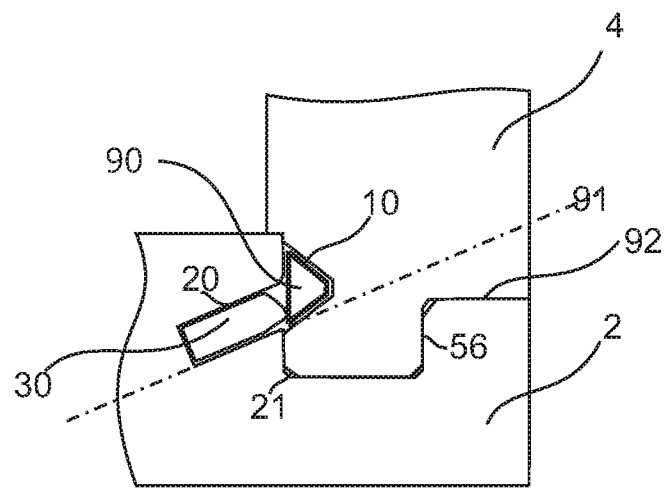

FIGS. 7A-7B show an embodiment of a dismantling groove or recess 34 that is provided at the inner face 62 of the second panel 4. Said dismantling groove or recess 34 is preferably adapted for insertion of a dismantling tool 90. The mechanical locking system may be unlocked by insertion of the dismantling tool 90 into dismantling groove. The insertion tool 90 is preferably configured to push the flexible tongue 30 further into the insertion groove 20 in order to unlock the mechanical locking system.

FIG. 7B shows that a dismantling tool 90 may be inserted into the tongue groove 10 provided that the edge section groove 21 and the tongue groove 10 are open at the back and/or front of the first panel 2 and the second panel 4.

The insertion of the flexible tongue 30 into the insertion groove 20 may be facilitated if a top surface 92 of the first edge section of the first panel 2 at the first wall 56 of the edge section groove 21 is lowered. A lowered top surface 92 increases the distance between a plane 91 extending in a direction of a lower surface of the insertion groove 20 and the top surface 92. This increased distance may provide more space for a tongue insertion machine.

The core material of the panels and elements in the embodiments above preferably comprises a wood fibre based board, such as a HDF, MDF, plywood, solid wood or particleboard, a reinforced plastic board, or a wood fibre composite board.

When the word "about" is used in this specification in connection with a numerical value, it is intended that the associated numerical value include a tolerance of +/−10% around the stated numerical value.

The invention claimed is:

1. A set of wood fibre based boards comprising a first wood fibre based board having a first main plane and a second wood fibre based board having a second main plane, wherein the first wood fibre based board and the second wood fibre based board are provided with a mechanical locking device configured for locking a first edge of the first wood fibre based board to a second edge of the second wood fibre based board, wherein the locking device is configured to lock the first wood fibre based board to the second wood fibre based board at a corner of an assembled product, wherein the first main plane is essentially perpendicular to the second main plane, wherein the first wood fibre based board comprises a core comprising fibres arranged essentially parallel to the first main plane and the second wood fibre based board comprises a core comprising fibres arranged essentially parallel to the second main plane, and the mechanical locking device comprises:

- an edge section groove at the first edge of the first wood fibre based board, wherein an edge section of the second edge of the second wood fibre based board is insertable into the edge section groove for locking the first wood fibre based board and the second wood fibre based board together in a direction parallel to the first main plane; and
- a flexible tongue arranged in an insertion groove provided in the edge section groove, wherein said flexible tongue cooperates with a tongue groove provided at the edge section of the second wood fibre based board, for locking the first wood fibre based board and the second wood fibre based board in a direction parallel to the second main plane, wherein a first thickness of a core material of the first wood fibre based board between the edge section groove and an outermost surface of the first edge in a direction parallel to the first main plane is greater than a minimum second thickness of a core material of the edge section of the second wood fibre based board, wherein the edge section groove comprises a first wall and an opposed second wall, wherein the first wall is closer to the outermost surface of the first edge than the second wall is to the outermost surface of the first edge, the first thickness is measured between the first wall and the outermost surface of the first edge, and wherein the flexible tongue is displaceable in a first direction in the insertion groove during locking of the first wood fibre based board with the second wood fibre based board, the first direction forming a non-zero angle with the second main plane.

2. The set of wood fibre based boards as claimed in claim 1, wherein the first thickness is between 1.1 and 3.0 times larger than the minimum second thickness.

3. The set of wood fibre based boards as claimed in claim 2, wherein the first thickness is about 1.25 times larger than the minimum second thickness.

4. The set of wood fibre based boards as claimed in claim 1, wherein the insertion groove extends along essentially the entire length of the edge section groove of the first edge.

5. The set of wood fibre based boards as claimed in claim 1, wherein the tongue groove extends along essentially the entire length of the edge section of the second wood fibre based board.

6. The set of wood fibre based boards as claimed in claim 1, wherein the edge section of the second wood fibre based board is provided with a calibrating groove.

7. The set of wood fibre based boards as claimed in claim 1, wherein the first wood fibre based board or the tongue groove of the second wood fibre based board is provided with a dismantling recess, said dismantling recess being adapted for insertion of a dismantling tool.

8. The set of wood fibre based boards as claimed in claim 1, wherein the edge section of the second wood fibre based board comprises a first wall and an opposite second wall, wherein the tongue groove is provided in the first wall, and the minimum second thickness is measured between a bottom of the tongue groove and the second wall.

9. The set of wood fibre based boards as claimed in claim 1, wherein the flexible tongue has a first displacement surface and a opposite second displacement surface which are configured to be displaced along a third displacement surface and a fourth displacement surface, respectively, of the insertion groove.

10. The set of wood fibre based boards as claimed in claim 1, wherein the outermost surface of the first edge of the first wood fibre based board is essentially flush with an outer face of the second wood fibre based board.

11. An assembled product comprising the set of wood fibre based boards as claimed in claim 1, which are locked together to form the assembled product.

12. The set of wood fibre based boards as claimed in claim 1, wherein the first direction forms an oblique angle with the first main plane.

* * * * *